US007898975B2

(12) United States Patent
Shi

(10) Patent No.: US 7,898,975 B2
(45) Date of Patent: Mar. 1, 2011

(54) METHOD AND DEVICE FOR OBTAINING CROSSTALK INFORMATION

(75) Inventor: Qingquan Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 12/203,611

(22) Filed: Sep. 3, 2008

(65) Prior Publication Data

US 2008/0316937 A1    Dec. 25, 2008

Related U.S. Application Data

(63) Continuation of application No. PCT/CN2007/000397, filed on Feb. 6, 2007.

(30) Foreign Application Priority Data

Mar. 3, 2006  (CN) .......................... 2006 1 0058355
Feb. 6, 2007  (WO) ................. PCT/CN2007/000397

(51) Int. Cl.
G01R 31/08   (2006.01)
G06F 11/00   (2006.01)
G08C 15/00   (2006.01)
H04J 1/16    (2006.01)
H04J 3/14    (2006.01)
H04L 1/00    (2006.01)
H04L 12/26   (2006.01)

(52) U.S. Cl. ........................................................ 370/252
(58) Field of Classification Search .................. 370/201, 370/352, 406.01

See application file for complete search history.

(56) References Cited

U.S. PATENT DOCUMENTS

| 6,912,243 | B1 * | 6/2005 | Ishioka ......................... 375/147 |
| 7,106,833 | B2 * | 9/2006 | Kerpez .......................... 379/1.03 |
| 2004/0095921 | A1 | 5/2004 | Kerpez |
| 2005/0265473 | A1 * | 12/2005 | Keller ............................. 375/267 |
| 2006/0039456 | A1 * | 2/2006 | Bostoen et al. ............... 375/222 |

FOREIGN PATENT DOCUMENTS

| CN | 1655470 A | 8/2005 |
| CN | 1716989 A | 4/2006 |
| EP | 1 630 968 A1 | 3/2006 |
| KR | 10-2005-0073850 A | 7/2005 |

OTHER PUBLICATIONS

Search Report issued in corresponding PCT Application No. PCT/CN2007/000397; mailed May 17, 2007.
Search Report issued in corresponding European Patent Application No. 07 71 0868; issued Jun. 26, 2009.

* cited by examiner

*Primary Examiner* — Huy D Vu
*Assistant Examiner* — Adnan Baig
(74) *Attorney, Agent, or Firm* — Brinks Hofer Gilson & Lione

(57) ABSTRACT

A method for obtaining crosstalk information includes the following steps: obtaining the transmission power variation of the crosstalk source and the noise power of the crosstalk destination; based on the obtained transmission power variation of the crosstalk source and the noise power of the crosstalk destination, obtaining the crosstalk coefficient of the frequency point in which the dynamic characteristic varies, as the crosstalk information. A device for obtaining crosstalk information comprises a crosstalk coefficient obtaining module for obtaining the crosstalk coefficient of the frequency point in which the dynamic characteristic varies. Based on the crosstalk coefficient in the lines, it is ensured that the crosstalk coefficient obtained is close to the real crosstalk information.

11 Claims, 4 Drawing Sheets

METHOD AND DEVICE FOR OBTAINING CROSSTALK INFORMATION

CLAIM FOR PRIORITY

The present application is a continuation application of commonly-assigned International Application No. PCT/CN2007/000397, filed Feb. 6, 2007, which claims the benefit of Chinese Patent Application No. 200610058355.1, filed on Mar. 3, 2006, both of which are herein incorporated by reference.

FIELD OF THE INVENTION

The present invention relates to twisted pair line transmission technique, and in particular to a method and device for obtaining Crosstalk information in far-end crosstalk condition.

BACKGROUND OF THE INVENTION

The Digital Subscriber Line (xDSL) technique is a high speed data transmission technique that transmits data through twisted pair telephone lines (i.e., Unshielded Twist Pair (UTP) lines), where "x" represents a collection of digital subscriber loop techniques. The XDSL technique includes not only baseband DSL techniques, such as ISDN Digital Subscriber Line (IDSL) and Single-pair High-bit-rate Digital Subscriber Line (SHDSL), but also pass-band XDSL techniques, such as Asymmetric Digital Subscriber Line (ADSL) that utilizes the Frequency-Division Multiplexing (FDM) technique to enable coexistence of xDSL and legacy telephone service (POTS) in the same twisted pair line. xDSL occupies a high frequency band, while POTS occupies a baseband below 4 KHz, and the POTS signals are separated from the xDSL signals by means of a separator. The pass-band XDSL employs Discrete Multi-Tone (DMT) modulation, and a system that provides multi-channel xDSL access is referred to as a DSL Access Multiplexer (DSLAM).

Through years of development, the ADSL technique has evolved from the first generation to the second generation ADSL2, ADSL2+, and the newer second generation VDSL2. The number of frequency bands used by pass-band xDSL is increasing gradually, and accordingly, the bandwidths are widened gradually. For example, ADSL and ADSL2 downlinks employ a frequency spectrum below 1.1 MHz, and can provide up to an 8 Mbps downlink data rate. ADSL2+ widens the downlink bandwidth to 2.2 MHz, and therefore can provide up to an 24 Mbps downlink data rate. VDSL2 even uses a frequency spectrum as high as 30 MHz, and accordingly can provide up to a 100 Mbps symmetric uplink/downlink data rate.

As the frequency band used by xDSL technique increases, the crosstalk among xDSL service ports on the same UTP line, especially the crosstalk in the high frequency band, becomes more and more severe. Because FDM is used for uplink and downlink XDSL channels, Near-End Crosstalk (NEXT) usually does not severely degrade system performance. However, Far-End Crosstalk (FEXT) will severely degrade UTP transmission performance.

SUMMARY

A method for obtaining crosstalk information includes: obtaining transmission power variation of crosstalk source and noise power of a crosstalk destination; obtaining a crosstalk coefficient at a frequency point at which a dynamic characteristic changes and taking the crosstalk coefficient as crosstalk information, in accordance with the transmission power variation of the crosstalk source and the noise power of the crosstalk destination.

A device for obtaining crosstalk information includes a crosstalk coefficient obtaining module, configured to obtain a crosstalk coefficient at a frequency point at which a dynamic characteristic changes.

The crosstalk coefficient obtaining module receives transmission power of a crosstalk source, transmission power of a crosstalk destination, noise power of a crosstalk destination, and the value of a transmission function of an affected channel at a frequency point at which a dynamic characteristic changes, obtains a crosstalk coefficient, and outputs the crosstalk coefficient.

By using the method provided in the present disclosure, the transmission power variation of the crosstalk source and the noise power of the crosstalk destination can be obtained, the crosstalk coefficient at the frequency point at which the dynamic characteristic changes can be obtained in accordance with the transmission power variation of the crosstalk source and the noise power of the crosstalk destination, and the obtained crosstalk coefficient can be taken as the crosstalk information. Further, by using the method provided in the present disclosure, multiple crosstalk coefficients can be obtained, and thereby a crosstalk curve can be created and taken as the crosstalk information. Alternatively, after one or more crosstalk coefficients are obtained, an approximate crosstalk function can be obtained with the FEXT model and the parameters of the crosstalk source and crosstalk destination, and the approximate crosstalk function can be updated by means of progressive or repeated recursion, so as to obtain crosstalk information, where the crosstalk source refers to a circuit that provides crosstalk, and the crosstalk destination refers to a circuit that is affected by the crosstalk source. Preferably, multiple crosstalk coefficients are obtained at different frequency points at a preset time interval, and then the approximate crosstalk function is updated for many times with the obtained crosstalk coefficients, so that the obtained crosstalk information will approximate to the actual crosstalk information gradually within a certain error range.

DETAILED DESCRIPTION OF THE EMBODIMENTS

Figure 1A:
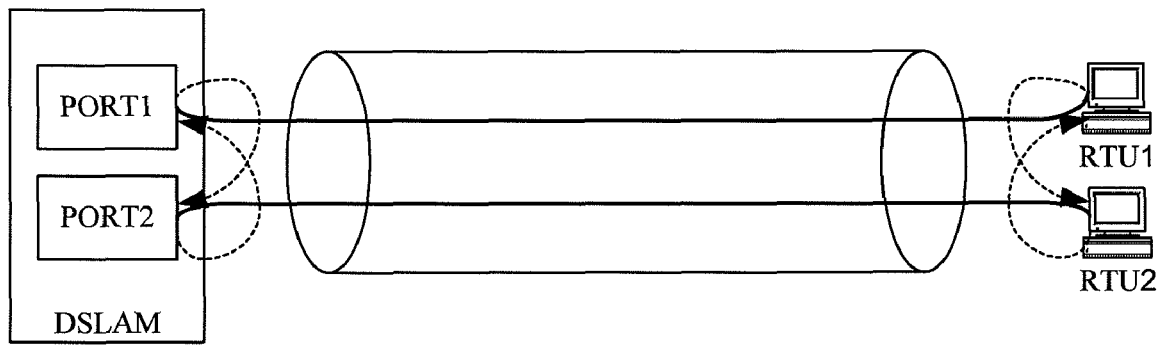
FIG. 1a is a schematic diagram of NEXT in the prior art.
Figure 1B:
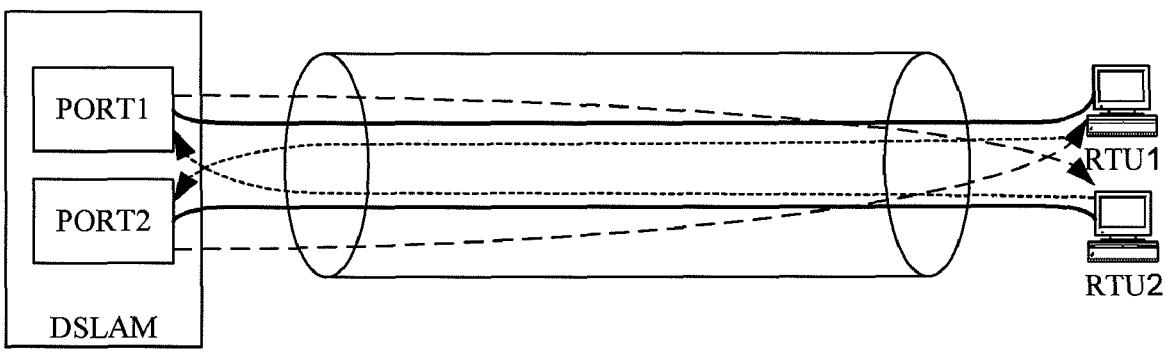
FIG. 1b is a schematic diagram of FEXT in the prior art.

FIG. 1a is a schematic diagram of NEXT in the prior art. As shown in FIG. 1a, at a near end, NEXT exists between PORT1 and PORT2 in a DSLAM; at a far end, NEXT exists between Remote Terminal Unit 1 (RTU1) and RTU2 that are connected to PORT1 and PORT2, respectively. FIG. 1b is a schematic diagram of FEXT in the prior art. As shown in FIG. 1b, PORT1 in the DSLAM produces FEXT in RTU2 connected to PORT2, and PORT1 suffers FEXT from RTU2. Similarly, PORT2 in the DSLAM produces FEXT in RTU1 connected to PORT1, and PORT1 suffers FEXT from RTU1. In FIG. 1a, dotted lines represent NEXT between the ports or terminals; in FIG. 1b, dotted lines represent FEXT between the ports or terminals.

When multiple users within a bundle of cables wish to access xDSL service, for example, the PORT1 and PORT2 shown in FIG. 1a and FIG. 1b that correspond to different RTUs respectively, line speed will be degraded, the performance will be unstable, and even the xDSL service cannot be provided normally due to FEXT, and therefore the DSLAM line activation rate will be degraded.

In view of the above problems that result from FEXT, many operators have established frequency spectrum application management specifications for regulating frequency spectrum planning in various applications, so as to avoid severe performance degradation due to mutual interference between equipment at various locations. Presently, technical research is being conducted in the area of Dynamic Spectrum Management (DSM) to study how to reduce or avoid the above effects due to crosstalk, such as iterated water-filling, optimal power spectrum control, and Multi-Input/Multi-Output (MIMO) solutions, etc.

From the viewpoint of crosstalk handling, the DSM technique comprises two levels. At a first level, the crosstalk is treated as noise. In this case, in order to obtain a frequency spectrum for optimizing of an xDSL transceiver and thereby improve the overall performance of all xDSL transceivers connected to a bundle of cables, crosstalk information needs to be obtained in advance, where the crosstalk information is referred to as the amplitude frequency characteristic of crosstalk. At a second level, the crosstalk is treated as useful signals by means of signal processing at the receiving side or transmitting side, for example, the crosstalk generated by a UTP in other UTPs can be gathered, combined, and recovered, for enhancing original signals. To this end, not only the amplitude frequency characteristic of the crosstalk but also the phase frequency characteristic of the crosstalk needs to be obtained. Because FEXT has a much severer effect on transmission performance of the lines than NEXT in an xDSL transmission system that employs FDM for uplink and downlink, only FEXT will be described below.

In summary, DSM can be studied only if the amplitude frequency characteristic/phase frequency characteristic of FEXT is obtained. Therefore, before the technique for DSM optimization is developed, the measurement and estimation of the characteristics of FEXT needs to be settled.

Figure 2:
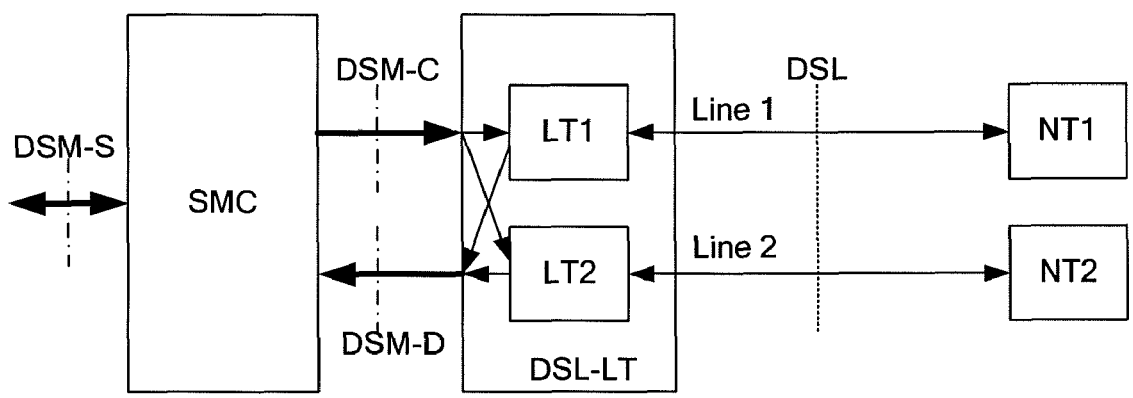
FIG. 2 is a schematic diagram of a reference model of a first level of DSM in the prior art.

The DSM technique is not commercially available. FIG. 2 is a schematic diagram of a reference model of a first level of DSM in the prior art. As shown in FIG. 2, the reference model of the first level of DSM includes a Spectrum Maintenance Center (SMC) configured to centrally control all lines and three control interfaces, i.e. a DSM-S interface, a DSM-C interface and a DSM-D interface. The SMC reads a parameter, e.g., the working state of the DSL from a DSL line terminal (DSL-LT) via the DSM-D interface and interchange information with an associated SMC via the DSM-S interface. After obtaining enough information, the SMC performs optimization calculation on the obtained information so as to obtain crosstalk information, and finally issues control parameters to the DSL-LT via the DSM-C interface so as to keep the line working in an optimal state.

At present, only a functional description has been made for the DSM reference model shown in FIG. 2, and there is no detailed implementation solution for this model.

The goal of the disclosed is to obtain transmission power variation of a crosstalk source and noise power of a crosstalk destination, obtain a crosstalk coefficient at a frequency point at which a dynamic characteristic changes in accordance with the obtained transmission power of the crosstalk source and the noise power of the crosstalk destination, and take the crosstalk coefficient as crosstalk information.

For a better understanding of these objects, technical solutions and advantages of the present invention, the present invention will be further detailed by way of preferred embodiments, with reference to the accompanying drawings.

Figure 3:
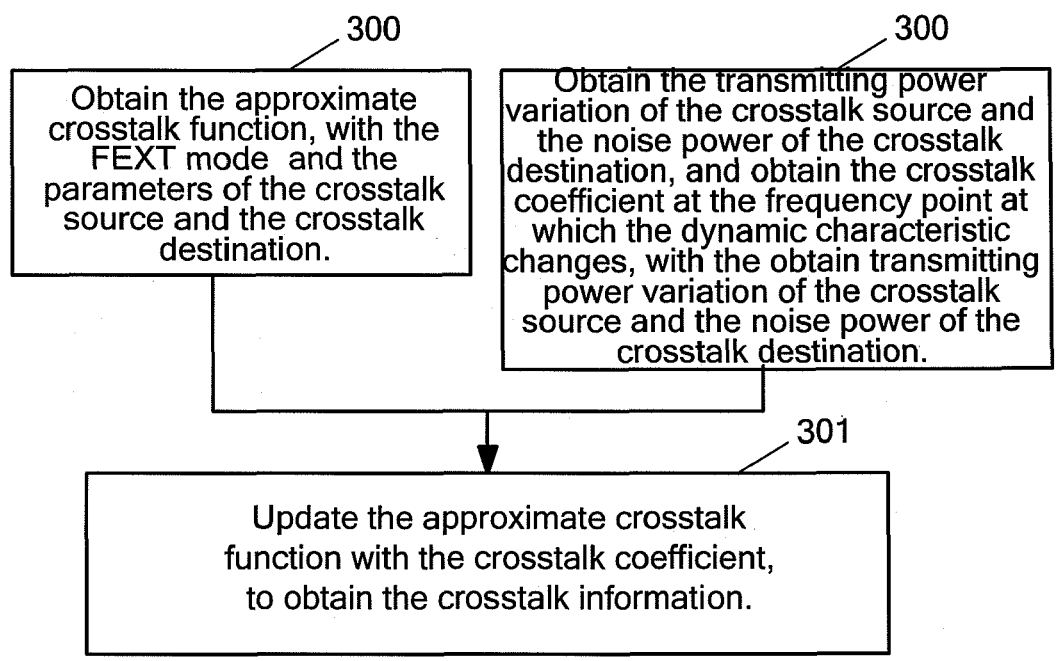
FIG. 3 is a flow diagram illustrating a method for obtaining crosstalk information according to one embodiment of the present invention.

FIG. 3 is a flow diagram illustrating an embodiment of a method for obtaining crosstalk information as detailed below.

Step 300: An approximate crosstalk function is obtained with an FEXT model and line parameters of a crosstalk source and a crosstalk destination; transmission power variation of the crosstalk source and noise power of the crosstalk destination are obtained, and then a crosstalk coefficient at a frequency point at which a dynamic characteristic changes is obtained in accordance with the transmission power variation of the crosstalk source and the noise power of the crosstalk destination.

In this step, it is well known in the art how to obtain the approximate crosstalk function. The FEXT model provided in G996.1 is represented by formula (1):

$$|H_{FEXT}(f)|^2 = |H_{channel}(f)|^2 \times k \times l \times f^2 \qquad (1)$$

where $|H_{channel}(f)|^2$ is the transmission function of an affected channel;

"k" is a coupling constant, and is equal to $$8 \times 10^{-20} \times \left(\frac{n}{49}\right)^{0.6},$$

where "n" is the number of pairs of lines that generate crosstalk in each other;

"l" is a coupling path length; and

"f" is a coupling signal frequency.

As defined in G997.1, the transmission function $|H^{channel}(f)|^2$ of the affected channel can be obtained from a linear channel insertion loss function Hlin(f) and a logarithmical channel insertion loss function Hlog(f) reported from xDSL transceiver. Actually, Hlin(f) or Hlog(f) are a sequence of numerical values, each of which represents the mean value within a sub-carrier spacing and is a known quantity.

As shown in FIG. 2, for example, assuming that Line 2 is a crosstalk source and Line 1 is a crosstalk destination, the approximate crosstalk function between Line 2 and Line 1 can be obtained as follows.

1) Hlin(f) and Hlog(f) of Line 1 and Line 2 are obtained via the DSM-D interface. It is well-known in the art how to obtain Hlin(f) and Hlog(f), the description thereof will not be further detailed here, please refer to definitions in relevant protocols.

2) According to relevant definitions in G993.2, the electrical lengths L1 and L2 of Line 1 and Line 2 are estimated from Hlin(f) and Hlog(f) of Line 1 and Line 2, and then the lower one of L1 and L2 are taken as the coupling path length "l" in expression (1). Alternatively, the electrical lengths L1 and L2 can be obtained directly from configuration parameters.

3) In this embodiment, because the number of line pairs is 1, i.e., n=1, the coupling constant is determined as $$k = 8 \times 10^{-20} \times \left(\frac{1}{49}\right)^{0.6}.$$

4) By reference to existing standards, the coupling signal frequency can be denoted as f=(1, 2 ... NSC−1)×ΔF, where NSC is the number of sub-carriers, ΔF is sub-carrier spacing. The NSC is dependent of the DSL standard, for example, for ADSL, the NSC can be 256, and ΔF is 4.3125 KHz.

An approximate crosstalk function H(f) can be calculated by substituting the obtained affected channel transmission function $|H_{channel}(f)|^2$, the coupling path length "l", the coupling constant "k", and the coupling signal frequency "f" into expression (1).

Figure 4A:
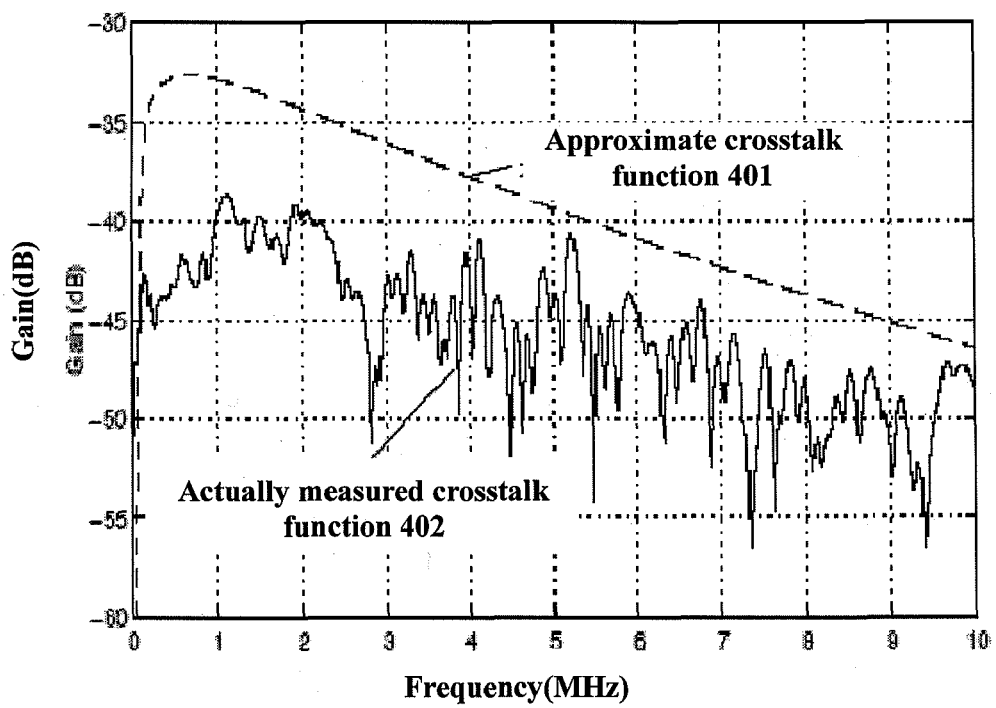
FIG. 4a is a schematic diagram of a comparison between an actual crosstalk function and an approximate crosstalk function according to an embodiment of the present invention.

Usually, the approximation crosstalk function H(f) obtained with the FEXT model provided in G996.1 reflects the worst cases which amount to 1% of the total cases. In other words, the approximate crosstalk function H(f) is larger than the actually measured crosstalk function in 99% of the total cases. FIG. 4a is a schematic diagram of a comparison between an actual crosstalk function and an approximate crosstalk function according to an embodiment of the present invention. As shown in FIG. 4a, the approximate crosstalk function 401 obtained merely with the FEXT model provided in G.996.1 deviates severely from the actually measured crosstalk function 402. In order to make the obtained approximate crosstalk function closer to the actually measured crosstalk function, the obtained approximate crosstalk function can be updated by executing the following steps of the method according to the present invention.

To update the obtained approximate crosstalk function, a crosstalk coefficient at a frequency point or crosstalk coefficients at some frequency points needs to be obtained in accordance with parameters of an xDSL transceiver. For example, as shown in FIG. 2, assuming that Line 2 is a crosstalk source and Line 1 is a crosstalk destination, the crosstalk coefficients can be obtained through the following steps:

1) A fixed time interval T is preset, for example, a timer with a fixed time interval is set. Within the fixed time interval T, the transmission power $P_2(nT)$ of Line 2 and the SNR parameter $SNR_i(nT)$ of Line 1 are acquired on a sub-carrier basis, where "n" represents various acquisition points. The acquisition method in which, after receiving the instruction from the upper layer, the xDSL transceiver reports the parameters specified in G997.1, is well known in the art and is irrelevant to the present invention, the description thereof will be omitted here.

In an actual operation process, there is a variety of dynamic information, such as online, offline, and execution of Bit Swapping, SRA, and DRR functions. These dynamic characteristics will vary with transmission power spectrum. As shown in Table 1, assuming that n=10, 10 transmission power values are acquired at frequency point $f_0$ at which a dynamic characteristic changes. Table 1 shows the transmission power values at 10 acquisition points.

TABLE 1

| n = 1 | N = 2 | n = 3 | n = 4 | n = 5 | n = 6 | n = 7 | n = 8 | n = 9 | n = 10 |
|---|---|---|---|---|---|---|---|---|---|
| 40 | 42 | 36 | 36 | 36 | 40 | 44 | 44 | 38 | 38 |

2) Transmission power variation $P_{del2}(nT)$ is calculated.

The average value of transmission powers is subtracted from the transmission power values, as shown in formula (2):

$$P_{del2}(nT)=P_2(nT)-E[P_2(nT)] \quad (2)$$

where the operator E represents averaging operation, which is well known in the art. The calculation result of $P_{del2}(nT)$ is shown in Table 2, which shows transmission power variations of Line 2 at 10 acquisition points.

TABLE 2

| n = 1 | n = 2 | n = 3 | n = 4 | n = 5 | n = 6 | n = 7 | n = 8 | n = 9 | n = 10 |
|---|---|---|---|---|---|---|---|---|---|
| 0.6 | 2.6 | −3.4 | −3.4 | −3.4 | 0.6 | 4.6 | 4.6 | 2.6 | 2.6 |

3) Noise power $N_1(nT)$ of Line 1 at above frequency point $f_0$ is calculated as shown in formula (3):

$$N_1(nT)=SNR_1(nT)-(P_1(nT)-H_{log1}(f_0)) \quad (3)$$

where $P_1(nT)$ is the transmission power of Line 1, Hlog1 $(f_0)$ is the value of logarithmical transmission function of the affected channel at the frequency point $f_0$.

In this embodiment, Line 2 generates FEXT in Line 1, and therefore the noise power of Line 1 varies with the transmission power spectrum of Line 2. Of cause, if there are more then one crosstalk sources for Line 1, the overall noise power of Line 1 will vary not only with the transmission power value of Line 2 but also the transmission power values of other crosstalk sources. In this case, the noise power of Line 1 will contain information on variation of transmission power value of Line 2 and transmission power values of other lines, i.e., $H_{21}(f_0) \cdot P_{del2}(nT)+ \ldots +H_{m1}(f_0) \cdot P_{delm}(nT)$, where "m" represents other lines, $Hm_1(f_0)$ represents the approximate crosstalk coefficient caused by Line m in Line 1 at frequency point $f_0$, and is also referred to as the estimated crosstalk coefficient at frequency point $f_0$; $P_{delm}(nT)$ represents the transmission power variation of Line m.

Because the transmission power variation of Line 2 is irrelevant to the transmission power variations of other lines that generate crosstalk in Line 1, if the acquired transmission power information is enough, it is believed that the inner product of the power variation of Line 2 and the power variations of other lines is equal to zero, i.e., ⟨$P_{del2}(nT)$, $P_{delm}(nT)$⟩=0, m≠2. Then, the crosstalk coefficient λ between Line 2 and Line 1 at frequency point $f_0$ can be calculated with the following formula (4):

$$\lambda = \frac{\langle P_{del2}(nT), N_1(nT) \rangle}{\langle P_{del2}(nT), P_{del2}(nT) \rangle} \quad (4)$$

where operator ⟨⟩ represents the inner product, which is well-known in the art, and therefore will not be described further here.

With formula (4), different crosstalk coefficients $\lambda_t$ can be obtained at different frequency points $f_t$.

It is should be noted that, if multiple frequency points are obtained at a preset time interval, multiple crosstalk coefficients can be obtained. The number of frequency points is dependent on actual situations. Usually, the more the frequency points are, the more even the distribution is, the better the approximation result of the approximate crosstalk function will be, and the closer the obtained crosstalk information will be to the actually measured crosstalk information.

Step 301: The approximate crosstalk function is updated by using the obtained crosstalk coefficient, so as to obtain the crosstalk information.

In this step, first, the frequency point $f_0$ and the crosstalk coefficient $\lambda_0$ corresponding to $f_0$ are substituted into expression (1) to calculate $k_0$, in this case, $k_0 = k \times l$;

Next, $k \times l$ is replaced with $k_0$ and substituted into expression (1) to calculate the approximate crosstalk function $H_{new}(f)$ for an entire frequency band;

Finally, the updated approximate crosstalk function H'(f) is obtained with the obtained H(f) and $H_{new}(f)$ by means of iteration, as shown in formula (5):

$$H'(f) = a \cdot H(f) + (1-a) \cdot H_{new}(f) \quad (5)$$

where the convergent coefficient $\alpha$ is used to represent the convergence rate of the crosstalk function, the higher the convergent coefficient $\alpha$ is, the lower the convergence rate will be, and the lower the convergent coefficient $\alpha$ is, the higher the convergence rate will be; usually, $0 < \alpha < 1$, for example, $$a = \frac{3}{4}.$$

Figure 4B:
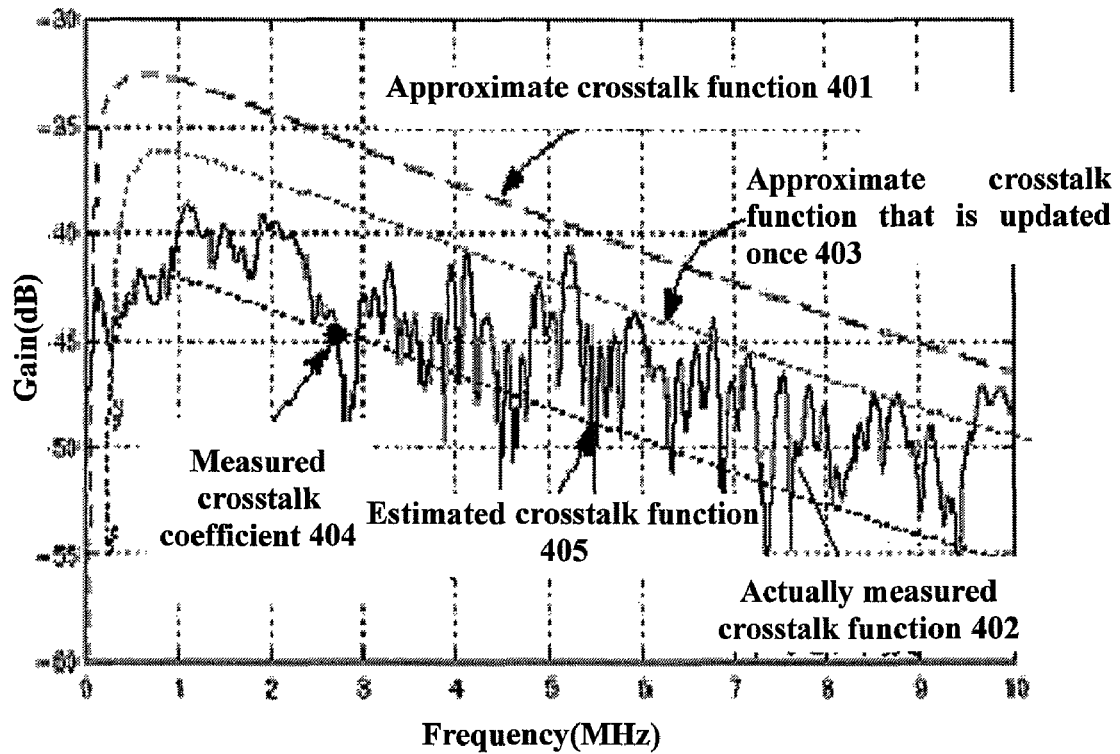
FIG. 4b is a schematic diagram of a comparison between an actual crosstalk function and the firstly updated approximate crosstalk function according to an embodiment of the present invention.

As far as concerned, the approximate crosstalk function is first updated with the method provided in the present invention. FIG. 4b is a schematic diagram of a comparison between an actual crosstalk function and the firstly updated approximate crosstalk function. As shown in FIG. 4b, after the first update, the approximate crosstalk function 403 is closer to the actually measured crosstalk function 402.

Figure 4C:
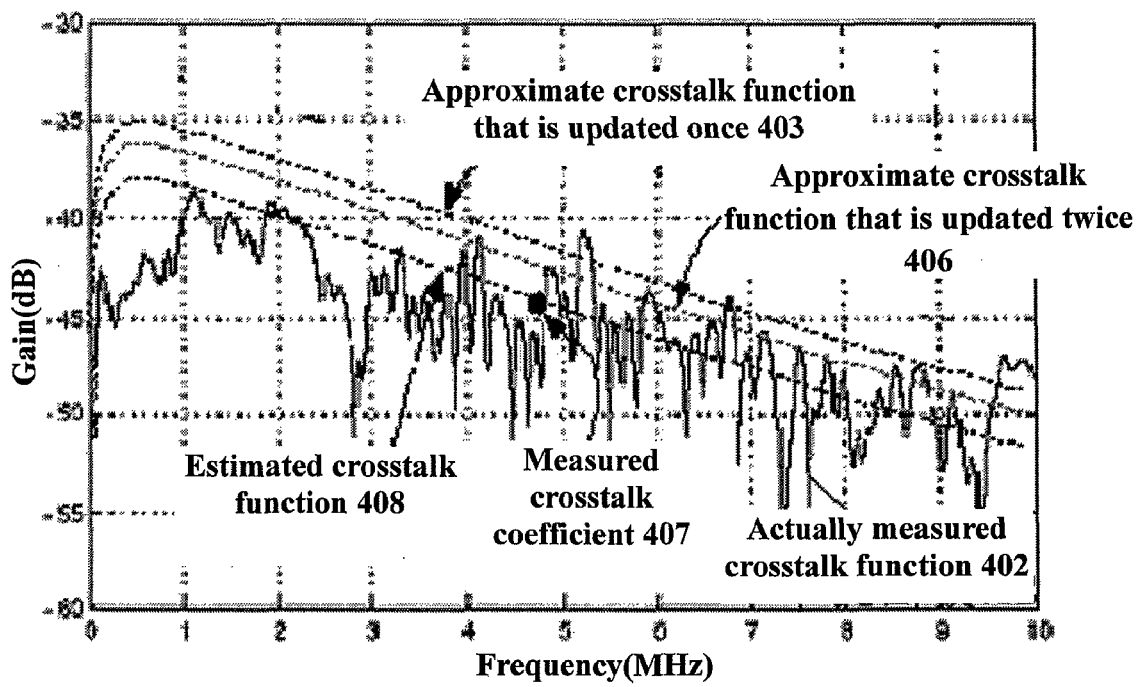
FIG. 4c is a schematic diagram of a comparison between an actual crosstalk function and the secondly updated approximate crosstalk function according to an embodiment of the present invention.

It should be noted that, in order to make the updated approximate crosstalk function much closer to the actually measured crosstalk function, the procedure of obtaining a crosstalk coefficient (e.g., crosstalk coefficient 404, crosstalk coefficient 407) and updating the approximate crosstalk function with the obtained crosstalk coefficient can be executed repeatedly, so as to obtain the crosstalk information. In that way, the updated approximate crosstalk function will be much closer to the actually measured crosstalk function. FIG. 4c shows a schematic diagram of a comparison between an actual crosstalk function and the secondly updated approximate crosstalk function. As shown in FIG. 4c, after the second update, the approximate crosstalk function 406 is much closer to the actually measured crosstalk function 402 than the approximate crosstalk function 403. After the crosstalk coefficients have been measured over all frequency points, a final output result will become the measured value.

It can be seen from the above description that, the method provided in the present disclosure can be used to estimate the actual crosstalk function by reporting the parameters and crosstalk mode function without any additional test. The method provided in the present disclosure is very simple, and does not need any additional function or equipment.

It should be noted that, if the required crosstalk information is only the crosstalk information corresponding to the frequency points, one of the objects of the present invention can be attained merely by executing the procedure of obtaining the crosstalk coefficient in step 300. Alternatively, this object can also be attained by creating a crosstalk curve with multiple crosstalk coefficients obtained through the procedure of obtaining crosstalk coefficient in step 300 and taking the crosstalk curve as the crosstalk information.

Figure 5:
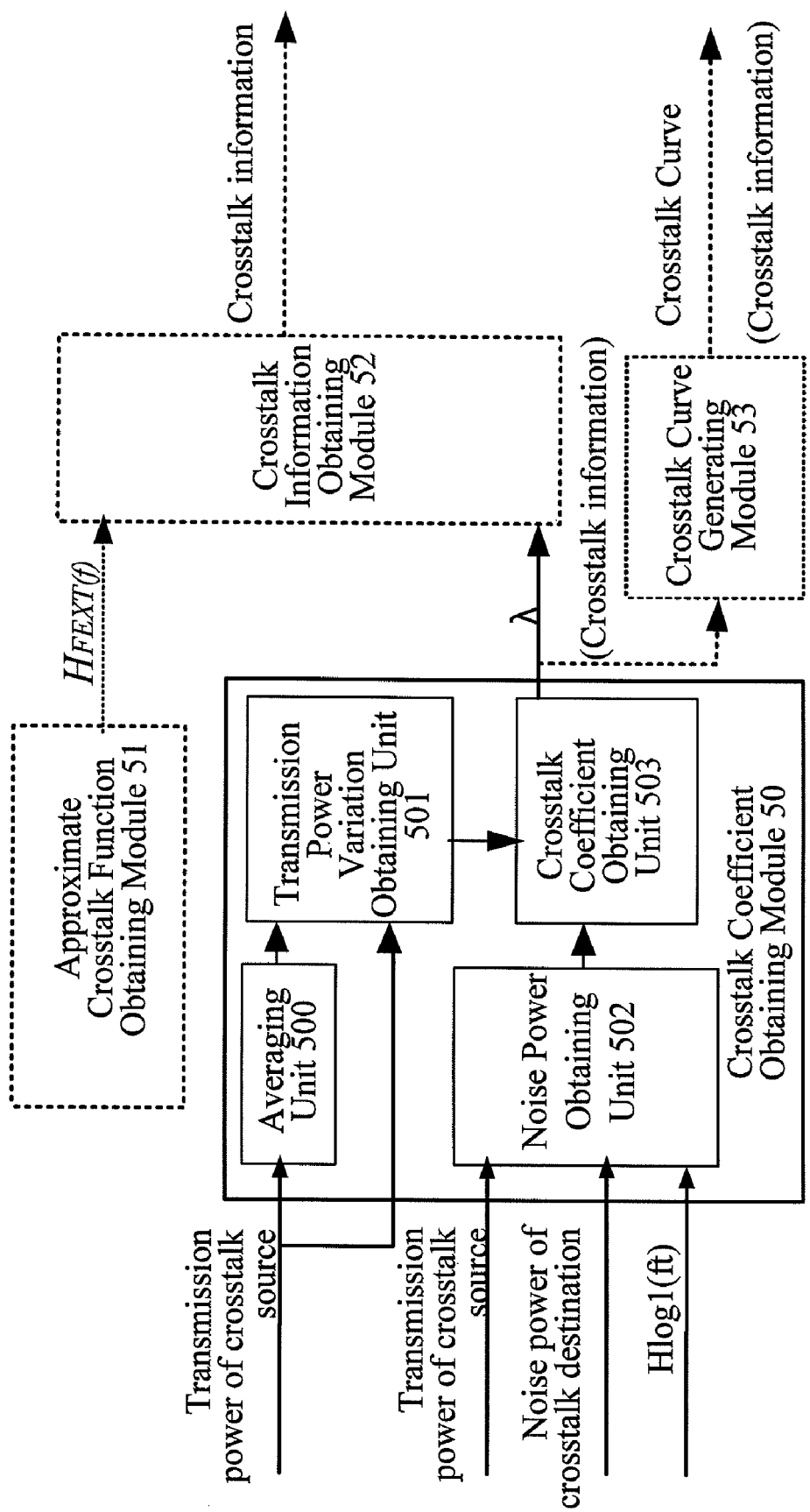
FIG. 5 is a schematic diagram of a device for obtaining crosstalk information according to one embodiment of the present invention.

FIG. 5 is a schematic diagram of a device for obtaining crosstalk information according to the present disclosure. As shown in FIG. 5, if the required crosstalk information is only the crosstalk information corresponding to the frequency points, the device for obtaining crosstalk information according to the present invention includes a crosstalk coefficient obtaining module 50, configured to obtain a crosstalk coefficient at a frequency point at which a dynamic characteristic changes, receive transmission power of a crosstalk source, transmission power of a crosstalk destination, noise power of the crosstalk destination, and the value of logarithmical transmission function of an affect channel at the frequency point at which the dynamic characteristic changes, obtain a crosstalk coefficient, and output the crosstalk coefficient. The crosstalk coefficient obtaining module 50 includes the following:

an averaging unit 500, configured to receive the transmission power of the crosstalk source, calculate the mean value of the transmission powers within a preset fixed time interval T, and output the mean value of the transmission powers to a transmission power variation obtaining unit 501;

a transmission power variation obtaining unit 501, configured to receive the average value of transmission powers from the averaging unit 500, receive transmission powers of the crosstalk source, calculate the transmission power variations of the crosstalk sources obtained within the preset fixed time interval T with formula (2), and output the transmission power variations of the crosstalk sources to a crosstalk coefficient obtaining unit 503;

a noise power obtaining unit 502, configured to receive the transmission power of the crosstalk destination, the noise power of the crosstalk destination, and the value of the logarithmical transmission function of the affected channel at the frequency point at which the dynamic characteristic changes, calculate the noise power of the crosstalk destination at the frequency point at which the dynamic characteristic changes with formula (3), and output the obtained noise power to a crosstalk coefficient obtaining unit 503; and a crosstalk coefficient obtaining unit 503, configured to receive the transmission power variation of the crosstalk source from the transmission power variation obtaining unit 501 and the noise power of the crosstalk destination at the frequency point at which the dynamic characteristic changes from the noise power obtaining unit 502, calculate the crosstalk coefficient of the crosstalk source at the frequency point at which the dynamic characteristic changes with formula (4), and output the crosstalk coefficient as the crosstalk information.

The device provided in the present disclosure further includes a crosstalk curve generating module 53, configured to collect crosstalk coefficients at multiple frequency points at which the dynamic characteristic changes from the crosstalk coefficient obtaining unit 503 in the crosstalk coefficient obtaining module 50, generate a crosstalk curve with the crosstalk coefficients, and output the crosstalk curve. The curve generating module 53 can be implemented in a variety of ways as required, and is well-known by those skilled in the art.

The device for obtaining crosstalk information in the present disclosure may further include:

an approximate crosstalk function obtaining module 51, configured to output an approximate crosstalk function corresponding to an FEXT model provided in G996.1 to a crosstalk information obtaining module 52; and a crosstalk information obtaining module 52, configured to receive the approximate crosstalk function from the approximate crosstalk function obtaining module 51, receive the crosstalk coefficient at the frequency point at which the dynamic characteristic changes from the crosstalk coefficient obtaining unit 503 in the crosstalk coefficient obtaining module 50, obtain a new approximate crosstalk function with the approximate crosstalk mode and crosstalk coefficient with formula (5) by means of recursion, and output the new approximate crosstalk function as the crosstalk information.

While the present invention has been illustrated and described by reference to some exemplary embodiments, the present invention is not limited to these. Those skilled in the art should recognize that various variations and modifications can be made without departing from the spirit and scope of the present invention as defined by the accompanying claims.

What is claimed is:

1. A method for obtaining crosstalk information, comprising:
    obtaining, by a crosstalk coefficient obtaining module, transmission power variation of a crosstalk source and noise power of a crosstalk destination;
    obtaining a crosstalk coefficient at a frequency point at which a dynamic characteristic changes in accordance with the transmission power variation of the crosstalk source and the noise power of the crosstalk destination;
    obtaining, by an approximate crosstalk function obtaining module, an approximate crosstalk function H(f) with a Far-End Crosstalk (FEXT) model and line parameters of the crosstalk source and the crosstalk destination;
    obtaining, by a crosstalk information obtaining module, a approximate crosstalk function $H_{new}(f)$ for an entire frequency band using the crosstalk coefficient;
    updating the approximate crosstalk function in accordance with H(f) and $H_{new}(f)$;
    obtaining the crosstalk information by performing a recursive operation on the updated approximate crosstalk function; and
    setting a convergence coefficient, wherein updating the approximate crosstalk function comprises:
    obtaining the crosstalk information by calculating a product of the approximate crosstalk function and the convergence coefficient, calculating the difference between a constant 1 and the convergence coefficient, and calculating a product of the difference and the approximate function $H_{new}(f)$ for the entire frequency band, and calculating a sum of the two products.

2. The method according to claim 1, wherein, the frequency point at which the dynamic characteristic changes comprises at least one point, the method further comprising: combining the crosstalk coefficients obtained at the frequency points at which the dynamic characteristic changes into a crosstalk curve, and taking the crosstalk curve as the crosstalk information.

3. The method according to claim 1, further comprising: setting and activating a timer with a timing interval T;
    wherein obtaining the transmission power variation of the crosstalk source comprises:
    acquiring transmission power values of the crosstalk source on a sub-carrier basis within the preset timing interval T,
    calculating the average value of all transmission power values of the crosstalk source, and
    subtracting the average value from the transmission power values of the crosstalk source to obtain the variations of the transmission power values of the crosstalk source.

4. The method according to claim 3, wherein obtaining the noise power of the crosstalk destination comprises:

acquiring SNR parameters and transmission power of the crosstalk destination on a sub-carrier basis, wherein the SNR parameters are one-to-one mapped to the transmission power of the crosstalk destination at the acquisition points; and
    calculating the transmission power of the crosstalk destination at each acquisition point, and the difference between the transmission power of the crosstalk destination at each acquisition point and the transmission function value of the affected channel at the frequency point at which the dynamic characteristic changes, obtaining the noise power of the crosstalk destination by subtracting the difference obtained at each acquisition point from the SNR parameter of the crosstalk destination.

5. The method according to claim 4, wherein obtaining the crosstalk coefficient comprises:
    obtaining a first inner product at each acquisition point by calculating the inner product of the transmission power variation of the crosstalk source and the noise power of the crosstalk destination, obtaining a second inner product by calculating the inner product of the transmission power variation of the crosstalk source and itself, and obtaining the crosstalk coefficient at the frequency point at which the dynamic characteristic changes by calculating the quotient of the first inner product and the second inner product.

6. The method according to claim 1, wherein obtaining the approximate crosstalk function H(f) comprises: calculating the product of the transmission function of the affected channel, coupling constant, coupling path length, and square of the coupling signal frequency, in accordance with the FEXT model.

7. The method according to claim 6, wherein updating the approximate crosstalk function comprises:
    calculating the product of the coupling constant and the coupling path length in accordance with the FEXT model by taking the frequency point at which the dynamic characteristic changes as the coupling signal frequency and taking the crosstalk coefficient at the frequency point as the value of the approximate crosstalk function H(f) at the frequency point at which the dynamic characteristic changes, and in accordance with the transmission function of the affected channel; and
    obtaining the updated approximate crosstalk function with the product of the coupling constant and coupling path length and the FEXT model.

8. The method according to claim 1, wherein, the crosstalk information is an amplitude-frequency characteristic of FEXT.

9. A device for obtaining crosstalk information, comprising:
    a crosstalk coefficient obtaining module, the crosstalk coefficient obtaining module being configured to obtain a crosstalk coefficient at a frequency point at which a dynamic characteristic changes, to receive transmission power of a crosstalk source, transmission power of a crosstalk destination, noise power of the crosstalk destination, and a value of a transmission function of an affected channel at a frequency point at which the dynamic characteristic changes, to obtain the crosstalk coefficient and output the crosstalk coefficient;
    an approximate crosstalk function obtaining module; and
    a crosstalk information obtaining module, wherein the approximate crosstalk function obtaining module is configured to output an approximate crosstalk function H(f) with a Far-End Crosstalk (FEXT) model to the crosstalk information obtaining module, wherein the crosstalk information obtaining module is configured to receive the approximate crosstalk function H(f) from the approximate crosstalk function obtaining module, receive the crosstalk coefficient at the frequency point at which the dynamic characteristic changes from the crosstalk coefficient obtaining module, obtaining an approximate crosstalk function $H_{new}(f)$ for an entire frequency band using the crosstalk coefficient, obtain a new approximate crosstalk function with H(f) and $H_{new}(f)$ by means of recursion, and output the new approximate crosstalk function as the crosstalk information;

and the device further comprising a noise power obtaining unit configured to obtain the crosstalk information by calculating a product of the approximate crosstalk function H(f) and a convergence coefficient, to calculate a difference between the constant 1 and the convergence coefficient, and to calculate a product of the difference and the approximate function $H_{new}(f)$ for an entire frequency band, and to calculate a sum of the two products.

10. The device according to claim 9, wherein the frequency point at which the dynamic characteristic changes comprises at least one point, and the device further comprises a crosstalk curve generating module, the crosstalk curve generating module being configured to collect crosstalk coefficients at multiple frequency points at which the dynamic characteristic changes from the crosstalk coefficient obtaining module, to generate a crosstalk curve with the crosstalk coefficients, and to output the crosstalk curve as the crosstalk information.

11. The device according to claim 9, wherein the crosstalk coefficient obtaining module comprises:

an averaging unit configured to receive transmission powers of the crosstalk source, to calculate an average value of the transmission powers within a preset fixed time interval T, and to output the average value of the transmission powers to a transmission power variation obtaining unit;

the transmission power variation obtaining unit configured to receive the average value of transmission powers from the averaging unit, receive transmission powers of the crosstalk source, to calculate transmission power variations of the crosstalk sources obtained within the preset fixed time interval T, and to output the transmission power variations of the crosstalk sources to a crosstalk coefficient obtaining unit;

a noise power obtaining unit configured to receive the transmission power of the crosstalk destination, noise power of the crosstalk destination, and a value of the logarithmical transmission function of the affected channel at the frequency point at which the dynamic characteristic changes, to calculate the noise power of the crosstalk destination at the frequency point at which the dynamic characteristic changes, and to output the obtained noise power to the crosstalk coefficient obtaining unit; and the crosstalk coefficient obtaining unit configured to receive the transmission power variation of the crosstalk source from the transmission power variation obtaining unit and the noise power of the crosstalk destination at the frequency point at which the dynamic characteristic changes from the noise power obtaining unit, to calculate the crosstalk coefficient of the crosstalk source at the frequency point at which the dynamic characteristic changes, and to output the crosstalk coefficient as the crosstalk information.

* * * * *